Patented Oct. 30, 1934

1,978,540

UNITED STATES PATENT OFFICE 1,978,540

MONO AND DIPYRIDINO QUINONE COMPOUNDS AND THEIR PRODUCTION

Max Albert Kunz, Mannheim, and Gerd Kochendoerfer and Karl Koeberle, Ludwigshafen-on-the-Rhine, Germany, assignors to General Aniline Works, Inc., New York, N. Y., a corporation of Delaware No Drawing. Application March 1, 1933, Serial No. 659,236. In Germany March 19, 1932

7 Claims. (Cl. 260—40)

The present invention relates to nitrogenous compounds being vat dyestuffs and process of making same.

A process for the manufacture and production of nitrogenous compounds is described in the application Ser. No. 462,412 according to which nitrogenous high molecular organic compounds, in particular nitro or amino compounds, containing at least four ring members, are treated in the presence of agents withdrawing water and preferably in the presence of substances having an oxidizing action and of additions promoting the reaction with organic compounds containing at least three carbon atoms and suitable for the formation of a pyridine ring, the resulting reaction products being, if desired, further substituted or condensed and substituted, as for example by oxidation.

It has also been proposed to apply the treatment, in the presence of agents withdrawing water and preferably in the presence of substances having an oxidizing action and of additions promoting the reaction with organic compounds containing at least three carbon atoms and suitable for the formation of a pyridine ring, to diaminopyrenes.

We have now found that very valuable nitrogenous compounds are obtained by subjecting pyridino compounds free from keto groups and containing in addition to at least one pyridino ring at least four carbocyclic rings, in condensed combination to an oxidizing treatment in acid media. The oxidation is preferably carried out with chromic acid, which is advantageously used while dissolved in glacial acetic acid or in the form of mixtures of alkali metal bichromates with sulphuric acid. In this manner oxidation products of the pyridino compounds are formed which are probably of the nature of quinones and which may be employed as vat dyestuffs or as intermediate products for the preparation of vat dyestuffs.

Pyridino compounds suitable as initial materials are for example mono- and di-pyridino compounds containing four or five aromatic rings, namely the mono- and di-pyridino-pyrenes, -perylenes, -chrysenes, their homologues and substitution products. Besides substituents produced by the oxidation further substituents, such as halogen, nitro groups and amino groups, may be introduced into the resulting pyridino derivatives by the usual methods. They may also be converted into the corresponding leuco derivatives, as for example into the leuco esters, by the usual methods.

The reaction products, usually obtained in almost theoretical yields, may, when necessary, be purified by the usual methods, as for example by crystallization, sublimation, by way of their salts, for example their oxonium or ammonium salts, or by treatment with mild oxidizing agents, as for example alkali metal hypochlorites.

The following examples will further illustrate the nature of this invention but the invention is not restricted to these examples. The parts are by weight.

Example 1

15 parts of dipyridinopyrene (obtained from diaminopyrene according to the methods of Skraup) are dissolved in a mixture of 300 parts of water and 38 parts of concentrated sulphuric acid. A solution of 15 parts of potassium bichromate in 100 parts of water is allowed to drop into the said solution of dipyridinopyrene at 80 to 90° C. while stirring. The oxidation and the precipitation of crystalline dipyridinopyrene-quinone begins at once.

As soon as an increase of the crystalline precipitate can no longer be detected the whole is allowed to cool and the precipitate is filtered by suction, washed and dried. The reaction product obtained in an excellent yield is a mixture of two dipyridinopyrenequinones which may be separated from one another, for example by fractional crystallization or by means of the different solubility of their sulphates. The dipyridinopyrenequinone obtained in a larger quantity is an orange crystalline powder dissolving in sulphuric acid giving an orange coloration and dyeing cotton from a violet-red vat golden yellow shades. The dipyridinopyrenequinone obtained in a smaller amount is a yellow powder; it dyes cotton from a dirty green vat greenish yellow shades and dissolves in sulphuric acid giving an orange coloration. The two reaction products probably correspond to the following formulae but it cannot be stated with certainty which one corresponds to the first formula and which one to the second formula

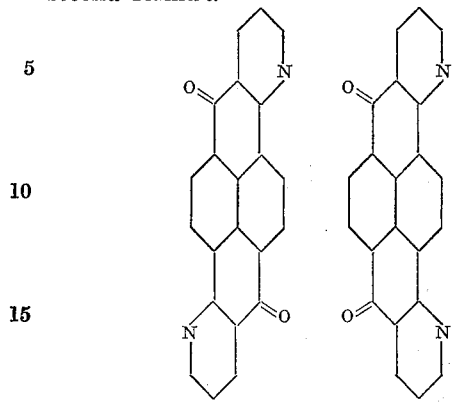

If instead of dipyridinopyrene dimethyldipyridinopyrene (obtainable from diaminopyrene according to the method of Doebner and von Miller) is employed, products are formed having similar properties.

Example 2

5 parts of monopyridinopyrene are dissolved in 100 parts of glacial acetic acid and treated with a concentrated aqueous solution of 4 parts of chromic anhydride at boiling temperature. Monopyridinopyrenequinone precipitates in brown crystals. After cooling the product is filtered off by suction; it may be recrystallized from organic solvents such as trichlorbenzene. It is an orange-brown powder melting at about 280° C., dissolving in sulphuric acid giving an orange coloration and dyeing cotton from red vat faintly orange-yellow shades. The product probably corresponds to the formula:—

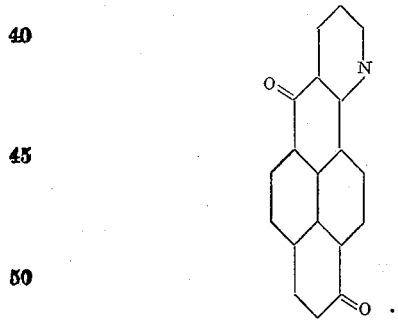

Example 3

15 parts of dipyridinochrysene are dissolved in 200 parts of glacial acetic acid at the boiling temperature. 10 parts of chromic anhydride dissolved in 20 parts of water are allowed to drop into the said mixture. The whole is allowed to cool and the crude product precipitated as a brown mass is filtered off by suction, washed and crystallized from trichlorbenzene. It is an orange crystal powder dissolving in sulphuric acid giving a reddish yellow coloration and dyeing cotton from a brown-red vat strong reddish yellow shades.

Example 4

10 parts of the product obtained according to Example 2 are heated in 100 parts of nitrobenzene for several hours at 100° C. while stirring after the addition of 1 part of iodine, 1 part of iron and 30 parts of bromine; then the mixture is heated for a short time at 170° C. allowed to cool and filtered by suction. The reaction product is a crystalline powder dissolving in concentrated sulphuric acid giving an orange coloration, yielding an orange vat and yellow dyeings.

By the action of sulphurylchloride a chloro derivative may be obtained from monopyridinopyrenequinone yielding yellow dyeings.

The halogenation may be carried out also in chlorosulphonic acid or in sulphuric acid.

What we claim is:—

1. Vat dyestuffs being oxidation products of pyridino compounds free from keto groups and selected from the group consisting of the pyridino compounds of pyrene and chrysene, said oxidation products being probably quinones of the said pyridino compounds, yielding a from orange to dirty green vat from which cotton is dyed from greenish yellow to orange shades and dissolving in concentrated sulphuric acid giving an orange to yellow coloration.

2. Vat dyestuffs being oxidation products of pyridino compounds free from keto groups and selected from the group consisting of the pyridino compounds of pyrene and chrysene, said oxidation products being probably quinones of the said pyridino compounds, yielding a from orange to dirty green vat from which cotton is dyed from greenish yellow to orange shades and dissolving in concentrated sulphuric acid giving an orange to yellow coloration.

3. The vat dyestuff being an oxidation product obtainable by oxidation in an acid medium of dipyridinopyrene, probably of the character of a dipyridinopyrenequinone, being an orange powder yielding a violet-red vat from which cotton is dyed golden yellow shades and dissolving in sulphuric acid giving an orange coloration.

4. The vat dyestuff being an oxidation product obtainable by oxidation in an acid medium of dipyridinopyrene, probably of the character of a dipyridinopyrenequinone, being a yellow powder, yielding a green vat from which cotton is dyed greenish yellow shades and dissolving in sulphuric acid giving an orange coloration.

5. The vat dyestuff being an oxidation product obtainable by oxidation in an acid medium of dipyridinochrysene, probably of the character of a dipyridinochrysenequinone, being an orange powder, yielding a brown-red vat from which cotton is dyed strong reddish yellow shades and dissolving in sulphuric acid giving a reddish yellow coloration.

6. The process of producing nitrogenous compounds which comprises subjecting a pyridino compound free from keto groups and selected from the group consisting of pyridino compounds of pyrene and chrysene, to an oxidizing treatment in an acid medium.

7. The process of producing nitrogenous compounds which comprises subjecting a pyridino compound free from keto groups and selected from the group consisting of pyridino compounds of pyrene and chrysene, to an oxidizing treatment with chromic acid.

MAX ALBERT KUNZ.
GERD KOCHENDOERFER.
KARL KOEBERLE.